Patented Feb. 10, 1931

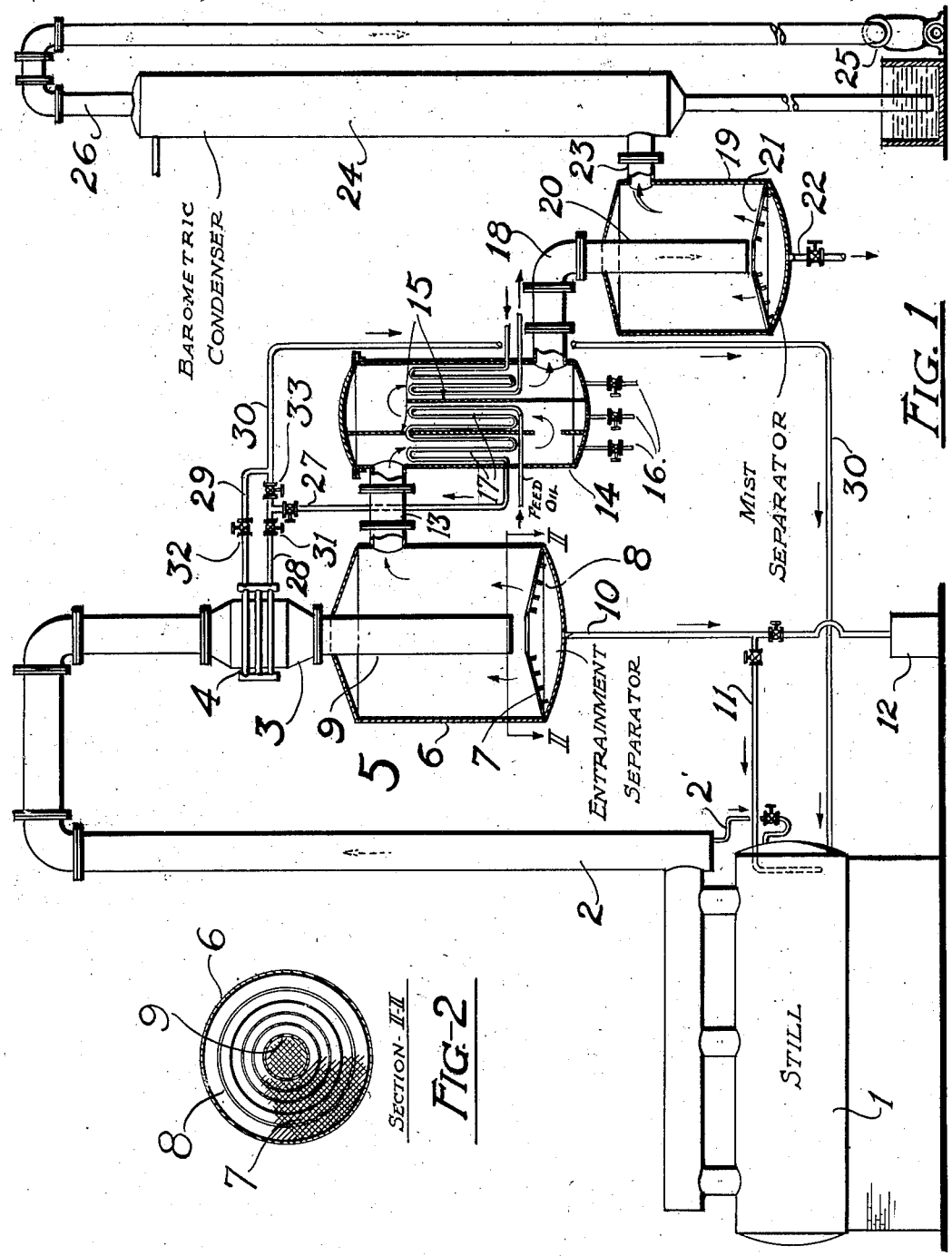

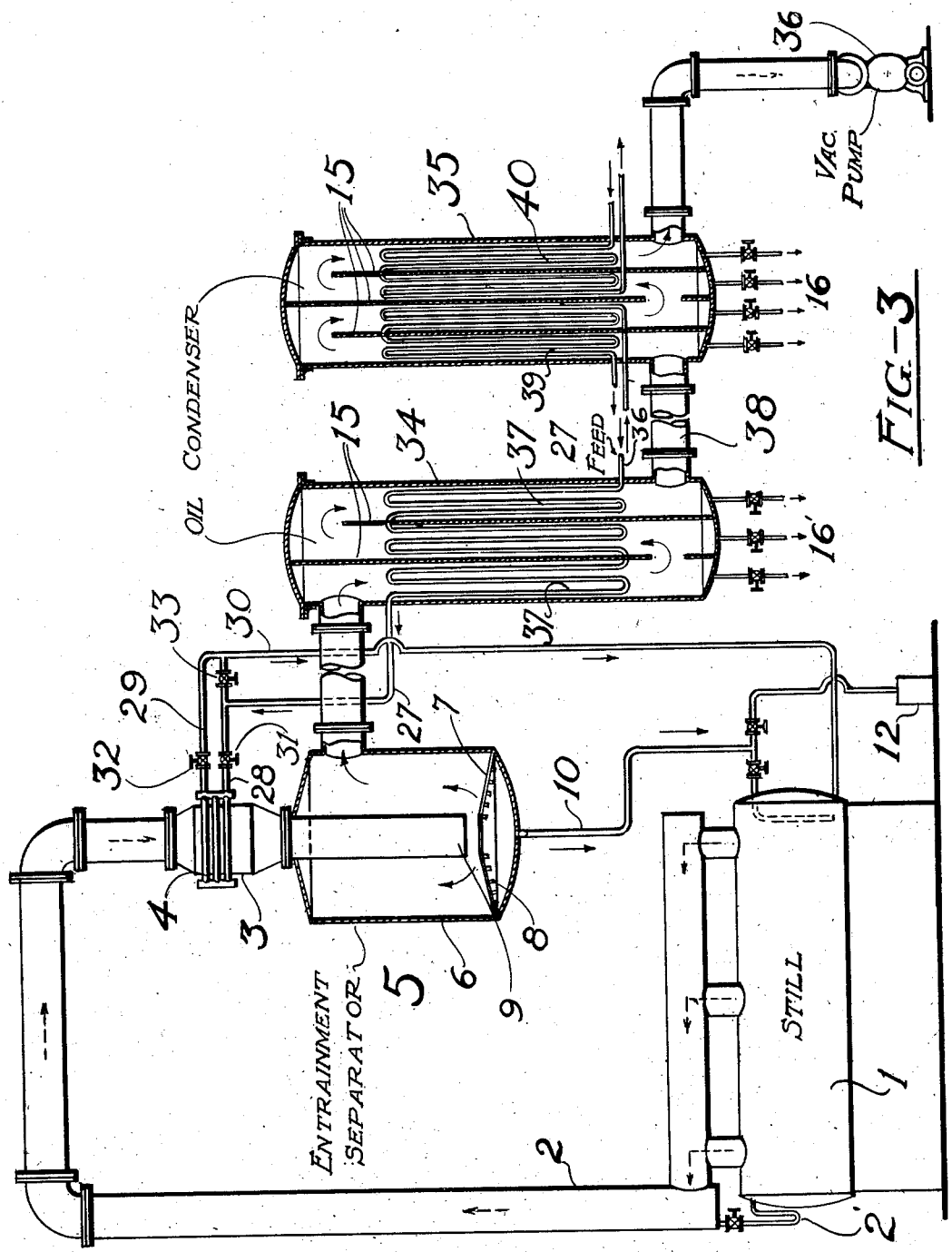

1,791,940

UNITED STATES PATENT OFFICE

ALEXANDER C. SPENCER, OF SARNIA, ONTARIO, CANADA, ASSIGNOR TO STANDARD OIL DEVELOPMENT COMPANY, A CORPORATION OF DELAWARE

USE OF ENTRAINMENT SEPARATORS IN VACUUM DISTILLATION

Application filed October 1, 1926. Serial No. 138,870.

This invention relates to improvements in methods and apparatus for the distillation of oils, particularly the vacuum distillation of hydrocarbon oils, and will be fully understood from the following description, read in connection with the accompanying drawing, in which Fig. 1 is a diagrammatic elevation, partly in section, showing a preferred embodiment of the invention.

Fig. 2 is a horizontal section on line II—II of Fig. 1; and

Fig. 3 is a diagrammatic elevation, partly in section, showing an alternative arrangement.

Referring to Figs. 1 and 2 of the drawings, reference numeral 1 denotes a vacuum still of any approved type, which is connected by a vapor line 2 of relatively large diameter with a cooler or partial condenser 3. The purpose of this is to reduce the temperature of the vapor stream somewhat, but not ordinarily to form any large amount of condensate. A valved run-back pipe 2' conveys any condensate formed in line 2 back to the still. A heat-exchange coil 4 is arranged in the cooler 3, preferably in such a way as to obstruct the flow of vapors as little as possible.

An entrainment separator 5 receives the vapors and liquids from the cooler 3. The entrainment separator comprises a cylindrical shell 6, which may have near its bottom a wire screen 7, preferably of a frusto-conical shape. The screen is supported by a metallic framework 8. Any other suitable means for distributing or finely subdividing the vapor stream may be used. A pipe 9 conveys downwardly the vapors and liquids entering the separator and discharges them upon the top of the screen 7. The fluid stream is broken up by the screen and the liquid is for the most part separated for withdrawal from the separator through a pipe 10. This pipe is connected with a return line 11 entering the still, and also with a receiving tank 12, so that the liquid separated may be either passed into the still or collected, as desired. The downward flow of the vapor stream, together with the baffling, sudden change of direction, and mainly the reduction of linear velocity, causes a very complete separation of entrained particles.

The vapors from the separator 5 pass through a pipe 13 to a condenser 14. This condenser may be of the type having staggered baffles 15 forming compartments, to each of which a valved draw-off line 16 may be connected. Condensates are drawn off through these lines to suitable receptacles (not shown). Cooling coils 17 are arranged in the spaces between the baffles 15. These coils should occupy as little of the area of the passageway as is consistent with the required cooling, for best results in high vacuum work.

When distilling under vacuum with injection of steam, the temperature in the condenser 14 will be controlled to condense substantially all the oil vapors, leaving the steam with traces of oil to pass through pipe 18 into a second entrainment separator 19. This is constructed in the same manner as entrainment separator 5. Separator 19 serves to remove any oil particles which may pass through the condenser 14 as in the form of a mist carried by the steam. Separator 19 has an inlet pipe 20, screen 21, and draw-off pipe 22, of the type described above, in connection with separator 5. Water vapor passes through pipe 23 into a barometric condenser 24. A vacuum pump 25 of any approved type is connected to a pipe 26 leading from the barometric condenser. The oil and any water removed from the vapor stream in separator 19 are drawn off through pipe 22.

The feed stock, or oil to be distilled, is preferably used as the heat-exchange medium in cooler 3. The oil is fed in through pipe marked "Feed oil" and then passes in succession through coils 17 in the intermediate and left-hand compartment of the heat exchanger 14. Thence the oil is forwarded through pipe 27 to pipe 28 which discharges into the heat-exchange or cooling coil 4. The oil passes from the coil 4 through pipe 29 to the pipe 30, which leads to the still 1.

The cooler 3 may be by-passed, if desired, by closing valves 31 and 32, arranged respectively in pipes 28 and 29, and opening valve 33 in the line 30. The feed stock may be sent through as many of the cooling coils 17 in the condenser 14 as may be required, and this condenser may have any suitable number of compartments for securing the desired gradation of temperature.

Only a single still and its overhead equipment have been illustrated, but it will be understood that I contemplate connecting stills in series. The method of series-connection need not be described here, since it is well understood in the art.

The dimensions of the entrainment separator equipment will of course vary with the rate at which vapor is to be disengaged from the liquid undergoing distillation. It may be said, for example, that the entrainment separators 5 and 19 may each be about 12 feet in diameter by 14 feet in height, for connection to a still producing about 50 barrels of distillate per hour. The vapor pipes in this installation may be about 3 feet in diameter. The separators do not cause an objectionable resistance to the passage of the vapors, and it is possible to hold a very low absolute pressure (say less than 50 mm. of mercury) in the system when using an efficient vacuum pump or barometric condenser and vacuum pump.

The amount of cooling by coil 4 will depend on the particular conditions. In general, as noted above, it should not be sufficient to cause any large amount of condensation. The desired removal of suspended particles can be obtained by a relatively slight reduction in the temperature of the vapor stream. The tendency to form a mist in the condenser 14 seems to be increased if the vapors are rapidly cooled in the last portion of their travel through the condenser. I therefore prefer to circulate warm water through the coil in the right-hand compartment of condenser 14.

In the form of the invention shown in Fig. 3, two condensers 34 and 35, directly connected to a vacuum pump 36, are provided. The still 1, partial condenser 3, entrainment separator 5, and their connections, may be the same as described in connection with Fig. 1. Feed oil is passed through pipe 36 into the coils 37 in condenser 34, and thence through pipe 27 to the heat-exchange coil 4. The preheated oil flows through pipe 30 to the still 1, where it may be distilled with steam.

In condenser 34 most of the oil vapor is condensed and fractions of decreasing specific gravity are taken off through pipes 16'. Residual oil vapors, together with steam, pass through pipe 38 into condenser 35. Warm water is passed through the coils 39 in the first two compartments of this condenser, and cold water is passed through the coils 40 in the last two compartments. Substantially complete condensation of vapors is obtained. Fixed gases and any residual vapors are drawn off through the vacuum pump 36.

Various changes and alternative arrangements in the equipment and procedure described above may be made within the scope of the appended claims, in which it is my intention to claim all novelty inherent in the invention as broadly as the prior art permits.

I claim:

1. In the vacuum distillation of petroleum oils, the improvement that comprises cooling the vapor stream from the vacuum still without substantial condensation, then suddenly changing the direction of flow of the stream and decreasing the linear velocity of said vapor stream, and passing the vapors to a condensing zone.

2. Method according to claim 1, in which the vapor stream is discharged downwardly into a large space, entrained matter is separated, and the vapors are withdrawn from the upper portion of said space.

3. In the vacuum distillation of hydrocarbon oils with injection of steam, a method that comprises taking the oil vapors and steam from the still to a zone in which they are cooled without extensive condensation, removing entrained droplets, condensing the greater portion of the oil in the vapor, drawing off the condensate, removing any residual oil entrained with the steam, and condensing the steam.

4. In the vacuum distillation of hydrocarbon oils, the method that comprises passing the oil vapors downwardly into a large space wherein entrained particles are separated, then passing the vapors through a condensing zone having a plurality of stages in series, passing a cooling medium through the first stages, passing a cooling medium at higher temperature through the last stage, taking off vapors escaping condensation to a second large space wherein entrained particles are separated, and condensing the vapors passing therefrom.

5. In combination with the vapor line of a petroleum oil vacuum still, means for cooling without substantially condensing the vapors passing through said line, a large entrainment separator receiving the cooled vapors and permitting substantially unimpeded flow of the same, while effecting the separation of the entrained liquid particles mainly in consequence of the reduction of fluid velocity in said separator, means for withdrawing the separated liquid particles, a condenser, and a vapor connection between the separator and the condenser.

6. Apparatus according to claim 5, in which there are provided a second large entrainment separator effecting the separation of the entrained liquid particles mainly in consequence of the reduction of fluid velocity in said second separator, means for withdrawing the separated liquid particles, and a connection for passing the vapors, escaping condensation in the condenser, into the second entrainment separator.

7. In combination with the vapor line of a petroleum oil vacuum still, a large entrainment separator effecting the separation of the entrained liquid particles mainly in consequence of the reduction of the fluid velocity and into which the vapor line projects downwardly, a screen in the bottom of the separator and against which the vapors are discharged, means for withdrawing the separated liquid particles, a condenser, and means for conveying the vapors from the separator to the condenser.

8. In combination with the vapor line of a petroleum oil vacuum still, a large entrainment separator effecting the separation of the entrained liquid particles mainly in consequence of the reduction of the fluid velocity and into which the vapor line projects, a condenser having a plurality of compartments in series, a line for conveying the vapor to the condenser, means for independently supplying cooling media to the first compartments and the last compartment of the condenser, a second entrainment separator effecting the separation of the entrained liquid particles mainly in consequence of the reduction of fluid velocity in said second separator, means for withdrawing the separated liquid particles, a vapor line between the condenser and the second separator, and means for condensing vapors leaving the second separator.

9. In combination with the vapor line of a petroleum oil vacuum still, a large entrainment separator effecting the separation of the entrained liquid particles in consequence of the reduction of the fluid velocity and into which the vapor line projects, a condenser having a plurality of compartments in series, a line for conveying the vapor to the condenser, means for independently supplying cooling media to the first compartments and the last compartment of the condenser, a second entrainment separator effecting the separation of the entrained liquid particles in consequence of the reduction of fluid velocity in said second separator, a vapor line between the condenser and the second separator, and means for condensing vapors leaving the second separator.

ALEXANDER C. SPENCER.